(12) United States Patent
Gautron et al.

(10) Patent No.: US 8,878,847 B2
(45) Date of Patent: Nov. 4, 2014

(54) METHOD FOR ESTIMATION OF AN ITEM OF INFORMATION REPRESENTATIVE OF HEIGHT

(75) Inventors: Pascal Gautron, Cesson Sevigne (FR); Jean-Eudes Marvie, Cesson Sevigne (FR); Patrice Hirtzlin, Cesson Sevigne (FR)

(73) Assignee: Thomson Licensing, Issy Les Moulineaux (FR)

( * ) Notice: Subject to any disclaimer, the term of this patent is extended or adjusted under 35 U.S.C. 154(b) by 122 days.

(21) Appl. No.: 13/443,916

(22) Filed: Apr. 11, 2012

(65) Prior Publication Data

US 2012/0262457 A1 Oct. 18, 2012

(30) Foreign Application Priority Data

Apr. 12, 2011 (FR) ...................................... 11 53169

(51) Int. Cl.
*G06T 15/40* (2011.01)
*G06T 15/04* (2011.01)
(52) U.S. Cl.
CPC ...................................... *G06T 15/04* (2013.01)
USPC .......................................................... 345/421
(58) Field of Classification Search
USPC .......................................... 345/421, 581–586
See application file for complete search history.

(56) References Cited

U.S. PATENT DOCUMENTS

| | | | | |
|---|---|---|---|---|
| 5,821,942 A * | 10/1998 | Avila et al. ..................... | 345/424 |
| 6,166,718 A * | 12/2000 | Takeda ......................... | 715/856 |
| 6,525,740 B1 * | 2/2003 | Cosman ......................... | 345/584 |
| 6,765,584 B1 * | 7/2004 | Wloka et al. ................... | 345/584 |
| 6,833,830 B2 * | 12/2004 | Collodi ......................... | 345/426 |
| 7,973,705 B2 * | 7/2011 | Cunning et al. ............... | 342/176 |
| 8,111,257 B2 * | 2/2012 | Axelrod et al. ................ | 345/473 |
| 8,267,781 B2 * | 9/2012 | Geiss ............................. | 463/32 |
| 8,314,791 B2 * | 11/2012 | Elsberg et al. ................ | 345/420 |
| 2002/0190988 A1 * | 12/2002 | Maillot et al. ................. | 345/428 |
| 2003/0206178 A1 * | 11/2003 | Hoppe et al. .................. | 345/582 |
| 2005/0093857 A1 * | 5/2005 | Wang et al. ................... | 345/419 |
| 2006/0109266 A1 * | 5/2006 | Itkowitz et al. ............... | 345/419 |
| 2009/0002363 A1 * | 1/2009 | Wu et al. ........................ | 345/419 |
| 2009/0015584 A1 * | 1/2009 | Shimizu ......................... | 345/420 |
| 2009/0167763 A1 * | 7/2009 | Waechter et al. ............. | 345/426 |
| 2009/0204563 A1 * | 8/2009 | Gerber et al. .................. | 706/53 |
| 2012/0105450 A1 * | 5/2012 | Sourimant et al. ............ | 345/421 |
| 2012/0238688 A1 * | 9/2012 | Iwashita et al. ............... | 524/504 |
| 2013/0016100 A1 * | 1/2013 | Bickel et al. .................. | 345/420 |

OTHER PUBLICATIONS

Van Verth, James M., Essential Mathematics for Games & Interactive Applications A Progarmmer's Guide, May 19, 2008, Morgan Kaufmann Publishers, Second Edition, pp. 363-364.*

(Continued)

*Primary Examiner* — David Zarka
*Assistant Examiner* — Brian Kravitz
(74) *Attorney, Agent, or Firm* — Tutunjian & Bitetto, P.C.

(57) ABSTRACT

The invention relates to a method for estimation of information representative of a height. In order to minimize the required calculation time, the method comprises steps for:
  selection of a first point from among a plurality of points of a normal map, a normal being associated with each of the points of said plurality, a reference height being associated with said first point,
  estimation of a height difference between the first point and a second point of the normal map different from the first point according to the normal associated with the second point and the distance separating the first point from the second point in the normal map.

9 Claims, 6 Drawing Sheets

(56) References Cited

OTHER PUBLICATIONS

Figure 1:
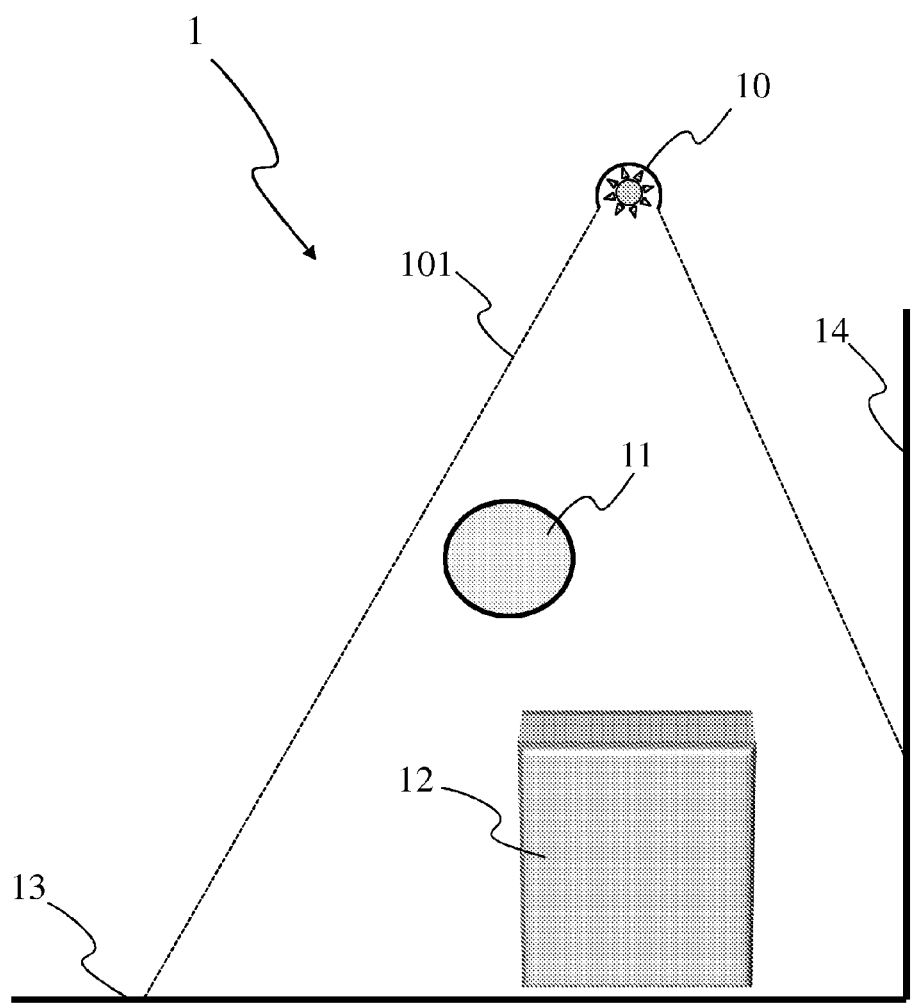

Smith et al, Height Estimation From Vector Fields of Surface Normals, 2002, Department of Computer Science, University of York, UK, pp. 1-4.*

Eberly, "Reconstructing a Height Field from Normal Map", Internet article, URL: http://www.geometrictools.com/Documentation/ReconstructHeightFromNormals.pdf, Mar. 1, 2008, pp. 1-15.

Fraile et al., "Spectral Modes of Facial Needle-Maps", Pattern Recognition and Image Analysis, Berlin, Heidelberg, Jun. 6, 2007, pp. 169-176.

Hill, "Hardware Accelerating Art Production", Internet article; URL: http://www.gamasutra.com/view/feature/2042/hardware_accelerating_art_php?print=1, Mar. 19, 2004, pp. 1-13.

French Search Report dated Jun. 15, 2011.

\* cited by examiner ably, the reflectance of the surface of an object
METHOD FOR ESTIMATION OF AN ITEM OF INFORMATION REPRESENTATIVE OF HEIGHT This application claims the benefit, under 35 U.S.C. §119 of FR Patent Application 1153169, filed 12 Apr. 2011.

1. DOMAIN OF THE INVENTION

The invention relates to the domain of synthesis image composition and more specifically to the domain of height-map generation for a virtual environment. The invention is also understood in the context of special effects for a live composition.

2. PRIOR ART

According to the prior art, it is known to use a heightmap also known as a heightfield, in techniques such as displacement mapping to simulate surface details of a virtual object. There are several methods for generating a heightmap, for example using fractals or using a terrain-editing program or using a paint program, each of these methods being costly in terms of calculations or in terms time spent to obtain the heightmap.

3. SUMMARY OF THE INVENTION

The purpose of the invention is to overcome at least one of these disadvantages of the prior art.

More specifically, the purpose of the invention is to optimise the calculation time and/or the calculations necessary to estimate an item of information representative of height.

The invention relates to a method for estimation of information representative of a height, comprising steps for:
- selection of a first point from among a plurality of points of a normal map, a normal being associated with each of the points of the plurality, a reference height being associated with the first point,
- estimation of a height difference between the first point and second point of the normal map different from the first point according to the normal associated with the second point and the distance separating the first point from the second point in the normal map.

According to a particular characteristic, the step of estimation of a height difference comprises a step of estimation of a vector between the first point and the second point.

Advantageously, the height associated with the second point is equal to the reference height to which is added the estimated height difference.

According to a specific characteristic, the estimation of height difference is weighted with a weighting factor.

Advantageously, the method comprises a step of estimation of a height difference between the second point and a third point of the normal map different from the first and second points according to the normal associated with the third point and the distance separating the second point from the third point in the normal map.

According to another characteristic, the height difference is associated with the second point stored in a heightmap.

Advantageously, the heightmap is applied to a surface of an object of a virtual environment.

According to a particular characteristic, the method comprises a step of estimation of an occlusion fact associated with the second point, the occlusion factor being estimated from heights associated with a plurality of points surrounding the second point.

According to a characteristic, the occlusion factor is stored in an occlusion map.

4. LIST OF FIGURES

Figure 2:
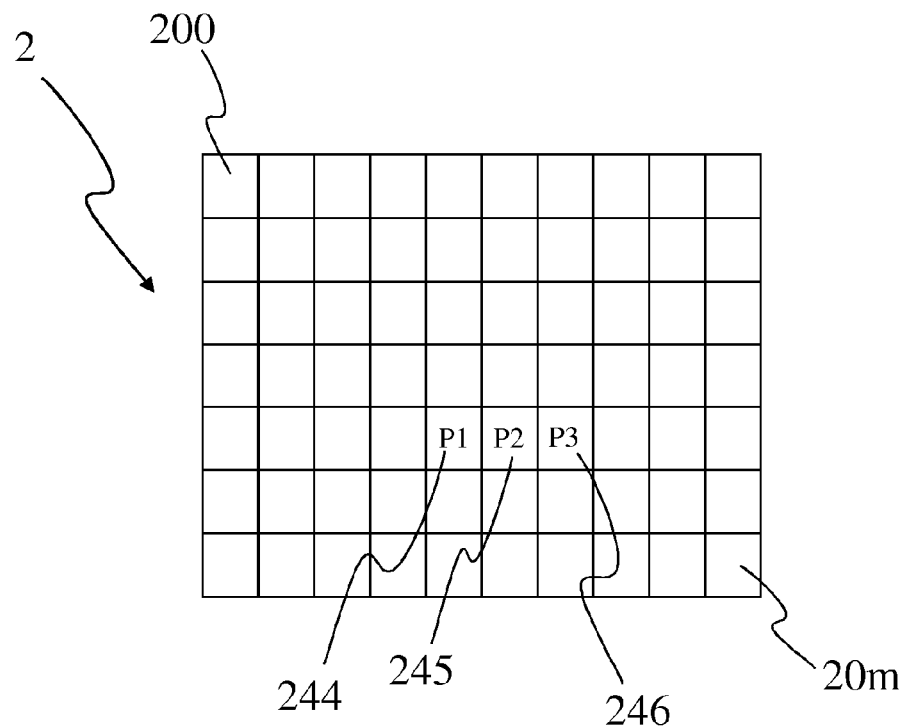
Figure 3:
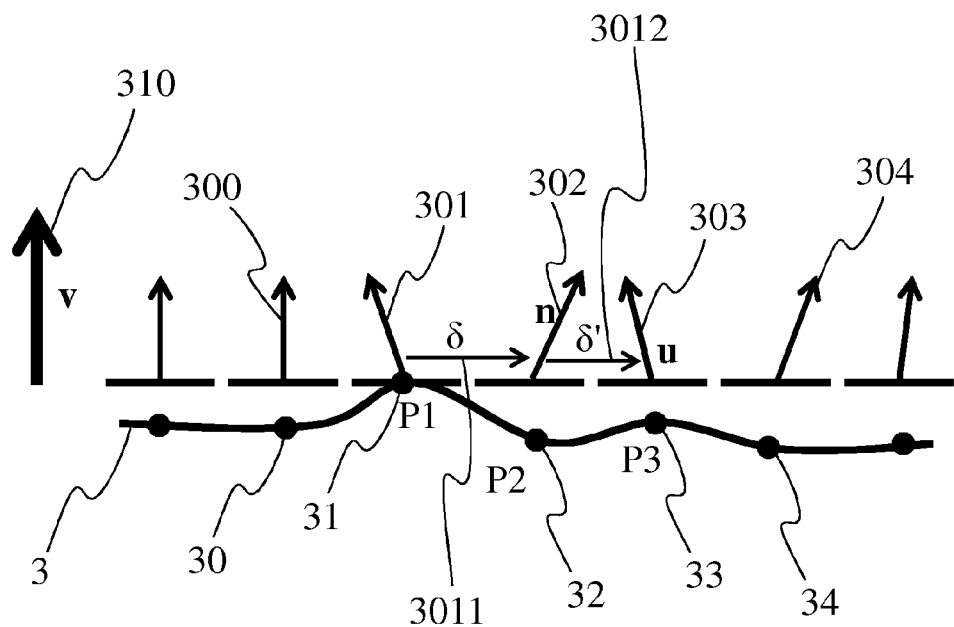
Figure 4:
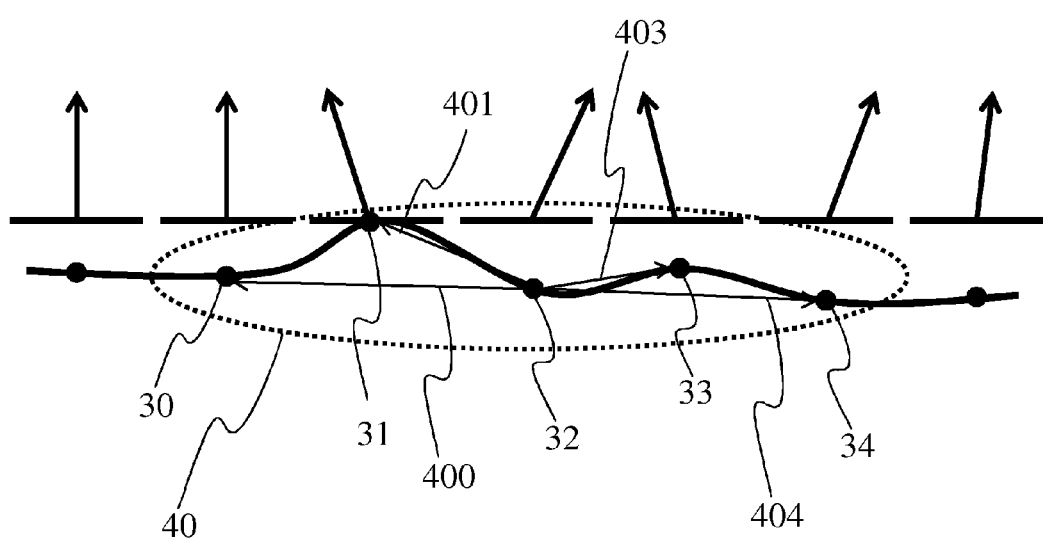
Figure 5:
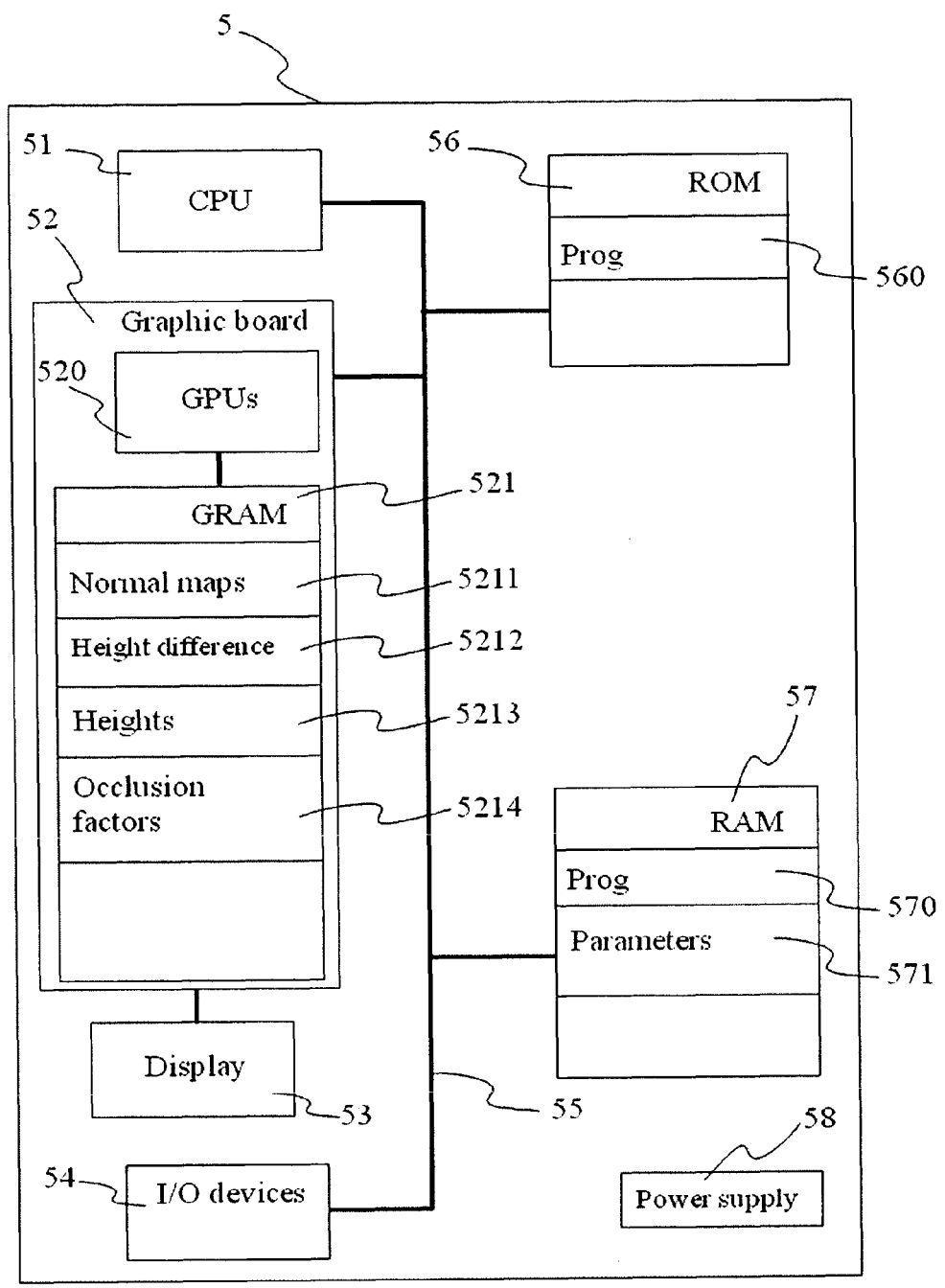
Figure 6:
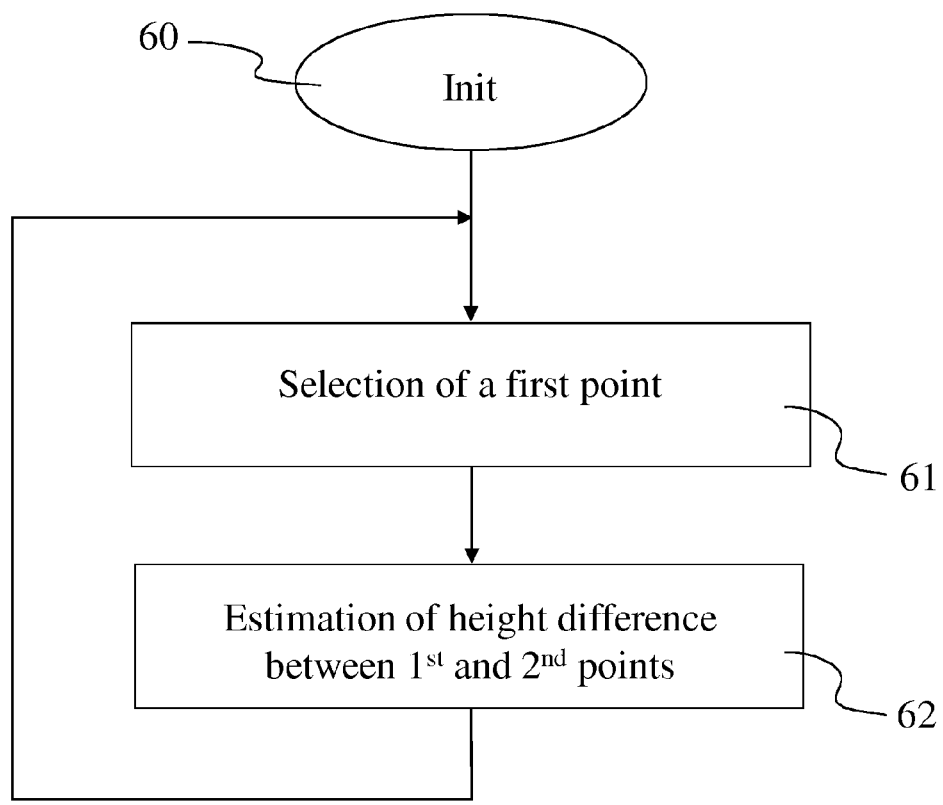
Figure 7:
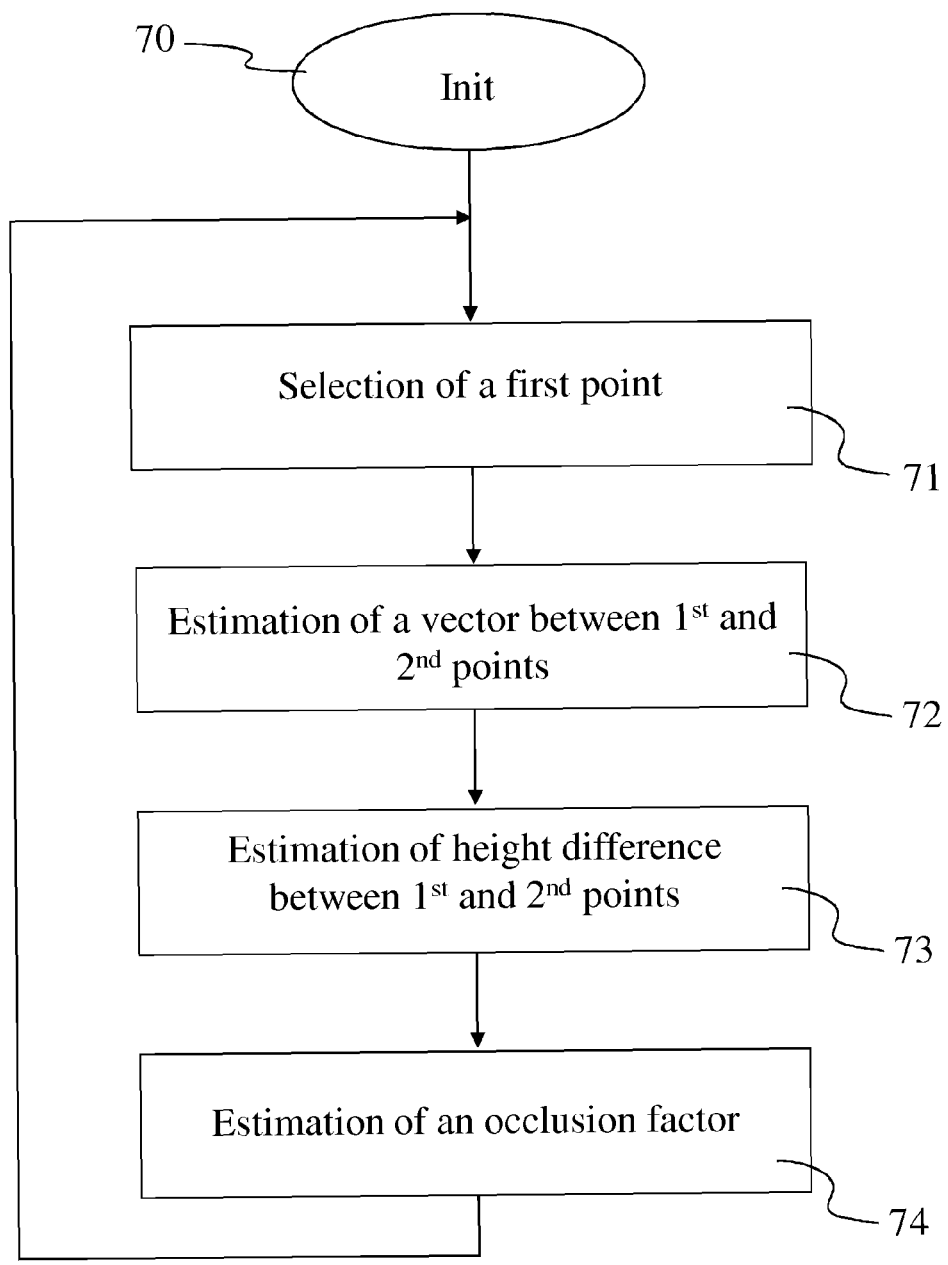

The invention will be better understood, and other specific features and advantages will emerge upon reading the following description, the description making reference to the annexed drawings wherein:

FIG. 1 diagrammatically shows a virtual environment lit by a light source, according to a particular embodiment of the invention, FIG. 2 diagrammatically shows a normal map that can be applied to the surface of an object of the virtual environment of FIG. 1, according to an embodiment of the invention, FIG. 3 diagrammatically shows a method for estimation of a heightmap using the normal map of FIG. 2, according to an embodiment of the invention, FIG. 4 shows a method for estimation of occlusion factors using the heightmap of FIG. 3, according to an embodiment of the invention, FIG. 5 shows a device implementing a method for estimation of information representative of a height, according to an embodiment of the invention, FIGS. 6 and 7 show a method for estimation of information representative of a height, according to two particular embodiments of the invention.

5. DETAILED DESCRIPTION OF EMBODIMENTS OF THE INVENTION

FIG. 1 shows a virtual environment or a virtual scene 1 lit by a light source 10. The light supplied by the light source 10 forms a cone of light 101. The virtual environment 1 comprises one or several virtual objects 11, 12, 13, and 14, modelled according to any method known to those skilled in the art, for example by polygonal modelling, in which the model is assimilated with a set of polygons each defined by the list of summits and edges that compose it, NURBS (Non uniform rational basic spline) type curve modelling in which the model is defined by a set of curves created via control vertices, modelling by subdivision of surfaces. By virtual object is understood any virtual representation (obtained by modelling) of an object (real or fictitious) composing a real environment (for example the ground, a house or a house front, a car, a tree, that is to say any element composing an environment such as a part of a house, a street, a town, the countryside, etc.) or imaginary. Each object 11, 12, 13, and 14 of the virtual environment is characterized by a surface covering it, the surface of each object having reflectance properties (corresponding to the proportion of incident light reflected by the surface in one or several directions) that are specific to it. Advantageously, the reflectance of the surface of an object varies according to the zone of the object reflecting the light (a zone of the surface comprising one or several points of the surface) that is to say that the reflectance of the surface of an object is not constant. According to a variant, the reflectance of the surface of an object is constant at any point of the surface of the object. Thus, the object 11 receives a quantity of incident light from the light source 10, this incident light being reflected by points of the surface of the object 11 lit by the light source 10. Understood by surface points are singular points or according to a variant to surface elements, each surface element comprising several points (for example 5, 10 or 20 points). In the remainder of the description of FIG. 1, a point of a surface designates both a unitary point and a surface element. Likewise, each of the objects 12 to 14 receives a quantity of incident light from the light source 10, this incident light being reflected by points lit by the light source 10. The information relative to the normal of each surface element reflecting the light is useful for estimating the quantity of light reflected according to a given direction.

According to a variant, the virtual environment 1 is lit by a plurality of light sources, for example 100, 1000, 100000 or 1000000 light sources.

FIG. 2 diagrammatically shows a normal map 2, according to a particular and non-restrictive embodiment of the invention. The normal map 2 is composed of a plurality of texels (TEXture ELement) 200 to 20 million. The normal map 2 corresponds to an RGB (Red, Green, Blue) image composed of m texels, the 3 RGB channels being used to store the values in X, Y and Z of coordinates of a normal vector to the tangent plane in a texel (or in a point) of a surface to which the normal map will be applied. Taking as an example the application of the normal map 2 to the surface of a virtual object of the virtual environment 1, for example the surface of the virtual object 11, this application will enable orientation information to be supplied to the surface of the object 11, each normal of the normal map 2 being associated with a point or a surface element of the object surface 11, without modifying the modelling of the surface of the object 11, that is to say without modifying the number of polygons used in the modelling of the object 11. When the object 11 is lit-up par by the light source 10, the account taken of orientation information associated with the surface of the object 11 via the normal map 11 enables the generation of grades or shading in the lighting of the surface of the object 11 by adding shades due to the surface orientation. The application of a normal map thus offers the advantage of simulating a micro-relief on the surface of the object 11 without increasing the number of polygons used for the modelling of the object 11. This simulation of micro-reliefs is satisfactory when the object 11 is viewed from sufficiently far away but however is insufficient when viewed from close-up. In fact, the silhouette of the surface not actually being deformed, the combination of shadow and light giving an impression of relief are not sufficient when the object 11 is viewed from close-up. Hereafter in the description, the notions of texel and pixel will be interchangeable and the term point will be used, a point corresponding to a unitary element (that is to say a texel) of the normal map or to a surface element (a unitary element of a surface, for example a pixel, or a surface element associated with this unitary element).

Advantageously, the normal map 2 is part of a collection of normal maps comprising several normal maps. Each normal map of the collection is advantageously representative of a particular relief type that can be applied to the surface of one or several virtual objects of the virtual environment 1.

FIG. 3 diagrammatically shows a method for generation of a heightmap using the normal map 2, according to a non-restrictive embodiment of the invention. The vectors 300, 301, 302, 303 and 304 correspond to some of the normal vectors of the normal map 2. Thus, the normal vectors 301, 302 and 303 are graphic representations of information representative of normal vectors stored (that is to say the coordinates in X, Y and Z) in respectively the points 244, 245 and 246 of the normal map 2. The vertical axis is represented by the vector v 310. In order to determine a heightmap using the normal map 2, the first step consists in selecting a first point of the normal map 2, for example the point P1 244, and assigning a reference height Hr to it, for example 0 m (meters). The choice of the first point P1 called the reference point is an arbitrary choice that is advantageously made by the user. According to a variant, the choice of reference point is predetermined, that is to say it corresponds to fixed coordinates of a point on the normal map 2. According to this variant, the reference point will be identical for any normal map. Likewise, the value of the reference height associated with the reference point P1 is chosen arbitrarily by a user and can take any value, for example 0 m, 0.1 m, 0.5 m, 1 m or more. This reference height value can also be negative, for example −1 m, −0.5 m or −0.1 m. The reference height is advantageously assigned to a first point P1 31 of a heightmap (also called height field) 3. In a second step, the height difference between a second point P2 of the normal map 2 and the first point P1 is determined. The second point P2 is a point in the immediate neighbouring area of the first point P1. This second point P2 advantageously belongs to one of the points touching (or surrounding) the first point P1 in the normal map 2. The selection of the second point is advantageously carried out using a "seed fill" method. According to a variant, the second point P2 selected corresponds to the point located for example right of the first point P1 in the line comprising the first point P1. According to this variant, the selection of the second point P2 is carried out using the "flood fill" method. In order to determine the height difference between the second point P2 and the first point P1, the normal vector 302 associated with the second point P2 is extracted from the normal map 2. Then the distance separating the first point P1 from the second point P2 in the plane of the normal map 2 is estimated, for example by determining the vector δ 3011 having as origin the first point P1 and as second extremity the point P2. The height difference d between the first point P1 and the second point P2 is then estimated with respect to the vertical axis shown by the vector v 310 using the following equation:

$$d = (n - v) \cdot \delta \qquad \text{Equation 1}$$

where d is the height difference in meters (m),
n is the normal vector at the surface at the second point P2,
v is the vector representative of the vertical axis,
δ corresponds to the vector separating the first P1 and the second P2 points at the level of the plane of the normal map.

According to a variant, the equation 1 enabling the height difference to be estimated between two neighbouring points is weighted by a coefficient α in the following way:

$$d = \alpha \cdot (n - v) \cdot \delta \qquad \text{Equation 2}$$

where α can take any value, for example 0.1, 0.5, 1, 2, 3 etc. this factor α advantageously enables more or less amplitude to be given to the height variation between two points and, as will be explained with respect to FIG. 4, to modulate the occlusion variations calculated using the heightmap.

The estimated height difference d is advantageously associated with a second point P2 32 of the heightmap 3. According to a variant, the absolute height of the second point P2 is associated with the second point of the heightmap in the place of the height difference, the absolute height H in meters (m) of the second point P2 corresponding to the sum of the reference height Hr in meters (m) and the height difference f in meters (m), which is:

$$H = Hr + d \qquad \text{Equation 3}$$

During an additional step, the height difference between a third point P3 and the second point P2 is estimated. The third point P3 is selected according to one of the selection methods referred to above, namely the "seed fill" or the "flood fill" method. If the third point is selected as being that to the right of the second point P2 in the line of the normal map 2 containing the second point P2, the third point P3 selected is the reference point 246 in the normal map 2. If the "seed fill" method is used the third point corresponds to a neighbouring point of the second point P2 in the normal map 2 for which the height difference has not been estimated. In order to estimate the height difference between the third point P3 246 and the second point P2 245, the normal vector 303 associated with the third point P3 246 is extracted from the normal map 2. Then the distance separating the second point P2 from the third point P3 in the plane of the normal map 2 is estimated, for example by determining the vector δ 3012 having as origin the second point P2 and as second extremity the third point P3. By applying one of the equations 1 or 2 to this new data, the height difference d is obtained between the second point and the third point, namely:

$$d'=(u-v)\cdot\delta', \text{ or} \qquad \text{Equation 4}$$

$$d'=\alpha\cdot(u-v)\cdot\delta' \qquad \text{Equation 5}$$

This height difference is advantageously associated with the third point P3 33 of the heightmap. According to a variant, the absolute height H' of the third point P3 is calculated before being associated with the third point P3 33 of the heightmap, the absolute height being equal to:

$$H'=H+d' \qquad \text{Equation 6}$$

According to the steps described above, it is possible to assign an item of information representative of height (that is to say a height difference or an absolute height) to any point of the normal map 2 by selecting the points of the normal map one by one starting from the selected reference point. A heightmap is thus obtained comprising as many points as there are points in the normal map 2.

The method described above has the advantage of obtaining height information using information stored in a normal map at a low cost in terms of calculations, a heightmap thus can be generated on-the-fly or in real time (live). In the case where a collection of normal maps is available comprising a great number of normal maps, it is possible to select any normal map and deduce on-the-fly a heightmap, this enables avoiding having to store in a collection of normal maps as many heightmaps as there are normal maps, thus reducing the required memory space.

By joining all the points 30 to 34 of the heightmap with which is associated the information representative of height, a surface 3 is obtained (for which a cross-section view is shown in FIG. 3) showing pits and peaks. The normal vectors 300 to 304 associated with each of these points 30 to 34 (and stored in the respective points of the normal map 2) represent the normal to the tangent plane at the point being considered. For example, the vector 300 is normal to the tangent plane at the surface element associated with the point 30, the vector 301 is normal at the tangent plane at the surface element associated with the point 31, the vector 302 is normal to the tangent plane at the surface element associated with the point 32, the vector 303 is normal to the tangent plane at the surface element associated with the point 33 and the vector 304 is normal at the tangent plane at the surface element associated with the point 34.

According to a particular embodiment of the invention, the heightmap generated according to the method described previously is applied to the surface of one or several objects of the virtual environment 1, for example at the surface of the virtual object 11. The application of a heightmap enables the surface of the object 11 to be deformed, the deformation at a point of the surface of the object 11 corresponding to the displacement of the surface at this point equal to the height value of the point of the heightmap associated with this point of the surface of the object 11 during the application of the heightmap. Contrary to the application of a normal map at the surface of an object that does not structurally deform the surface of the object, the application of a heightmap enables the visual aspect of the surface to be modified. An object on which is applied the heightmap viewed from close-up has peaks and pits that enable moreover sets of shadow and light to be generated. The application of a heightmap on the surface of an object provides more realism to the object than the application of a normal map and even more so the more the object is viewed from close-up.

FIG. 4 diagrammatically shows a method for estimation of occlusion factors using the heightmap 3, according to a particular and non-restrictive embodiment of the invention. The elements identical to FIGS. 3 and 4 retain the same references. In order to determine the occlusion factor associated for example with the second point P2 32, a disk 40 of radius R centred on the second point P2 32 is chosen. The radius R of this disk 40 is chosen for example by a user, the radius R being chosen according to the desired diffusion effect, the diffusion effect being greater as R is increased (R being for example 10, 30 or 50 texels around the point considered of the normal map). The disk 40 comprises a plurality of points 30, 31, 33, 34 surrounding the second point P2 32 and belonging to the surface 3. Advantageously, an occlusion factor associated with the second point P2 32 is determined from the distance 400, 401, 403, 404 separating the second point P2 32 from respectively each of the points 30, 31, 33, 34 of the disk 40 and the height associated with each of these points 30, 31, 33, 34 in the heightmap. The occlusion factor associated with the second point P2 32 is representative of the ambient occlusion in this second point P2 due to height variations of points surrounding this second point in the heightmap or in the corresponding normal map. Advantageously, the occlusion factor associated with the second point is equal to the sum of height over distance ratios at the second points for the points of the disk 40 divided by the number of points surrounding the second point P2 of the disk 40, is to say:

$$\beta = \frac{\sum_{i=1}^{n} \frac{Hi}{Di}}{n} \qquad \text{Equation 7}$$

Where β is the occlusion factor,
n Corresponds to the number of points $P_i$ surrounding the second point and belonging to the disk 40,
$H_i$ is the height associated with the point $P_i$
$D_i$ corresponds to the distance separating the second point P2 from the point $P_i$ According to a variant, a plurality of rays having as origin the second point P2 32 are launched via a half-sphere having as a base the disk 40 and as centre the second point 32 and rising over the disk 40. The intersections between each of these rays and the surface 3 representative of the heightmap are determined by discretizing launched rays. The occlusion factor associated with the point P2 corresponds for example to the ratio between the number of rays having an intersection with the surface 3 over the total number of rays. The discretization of each of the rays launched enables the intersection point with the surface 3 to be determined with precision when it exists.

Advantageously, an occlusion factor is determined for each of the points of the normal map (or the heightmap that comprises the same points). The occlusion factors are stored in an occlusion map comprising as many points as the normal map 2. It is also possible to say that an occlusion factor is associated with each point of the normal map 2 or that an occlusion factor is associated with each point of the heightmap.

FIG. 5 diagrammatically shows a hardware embodiment of a device 5 adapted for the estimation of an item of information representative of height or representative of occlusion or both and for the creation of display signals of one or several images representative of the virtual environment 1. The device 5 corresponding for example to a personal computer (PC), a laptop or a games console.

The device 5 comprises the following elements, connected to each other by a bus 55 of addresses and data that also transports a clock signal:
- a microprocessor 51 (or CPU),
- a graphics card 52 comprising:
   - several Graphicole Processor Units (or GPUs) 520,
   - a Graphical Random Access Memory (GRAM) 521,
- a non-volatile memory of ROM (Read Only Memory) type 56,
- a Random Access Memory or RAM 57,
- one or several I/O (Input/Output) devices 54 such as for example a keyboard, a mouse, a webcam, and
- a power source 58.

The device 5 also comprises a display device 53 of display screen type directly connected to the graphics card 52 to display notably the display of synthesized images calculated and composed in the graphics card, for example live. The use of a dedicated bus to connect the display device 53 to the graphics card 52 offers the advantage of having much greater data transmission bitrates and thus reducing the latency time for the displaying of images composed by the graphics card. According to a variant, a display device is external to the device 5 and is connected to the device 5 by a cable transmitting the display signals. The device 5, for example the graphics card 52, comprises a means for transmission or connection (not shown in FIG. 5) adapted to transmit a display signal to an external display means such as for example an LCD or plasma screen or a video-projector.

It is noted that the word "register" used in the description of memories 521, 56 and 57 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 51 loads and executes the instructions of the program contained in the RAM 57.

The random access memory 57 notably comprises:
- in a register 570, the operating program of the microprocessor 51 responsible for switching on the device 5, The algorithms implementing the steps of the method specific to the invention and described hereafter are stored in the memory GRAM 521 of the graphics card 52 associated with the device 5 implementing these steps. When switched on and once the parameters 571 representative of the environment are loaded into the RAM 57, the graphic processors 520 of the graphics card 52 load these parameters into the GRAM 521 and execute the instructions of these algorithms in the form of microprograms of "shader" type using HLSL (High Level Shader Language) language or GLSL (OpenGL Shading Language) for example.

The random access memory GRAM 521 notably comprises:
- values 5211 representative of coordinates X, Y and Z of normal vectors of a normal map 2,
- values 5212 representative of height differences associated with the points forming the normal map 2,
- values 5213 representative of heights associated with the points of a heightmap 3, and
- values 5214 representative of occlusion factors associated with the points of the normal map 2 or heightmap.

According to a variant, the values 5211 to 5214 are stored in the RAM 57 and processed by the microprocessor 51.

According to another variant, a part of the RAM 57 is assigned by the CPU 51 for storage of the values 5211 to 5214 if the memory storage space available in GRAM 521 is insufficient. This variant however causes greater latency time in the composition of an image comprising a representation of the environment 1 composed from microprograms contained in the GPUs as the data must be transmitted from the graphics card to the random access memory 57 passing by the bus 55 for which the transmission capacities are generally inferior to those available in the graphics card for transmission of data from the GPUs to the GRAM and vice-versa.

According to another variant, the power supply 58 is external to the device 5.

FIG. 6 shows a method for estimation of an item of information representative of a height implemented in a device 5, according to a first non-restrictive particularly advantageous embodiment of the invention.

During an initialisation step 60, the different parameters of the device 5 are updated. In particular, the parameters representative of the virtual environment 1 and/or the information contained in the different maps (for example the normal map) are initialised in any way.

Then during a step 61, a first point is selected from among the set of points (also called texels) forming a normal map. At each point of the normal map a normal vector is associated represented by its X, Y and Z coordinates. A reference height is associated with this first height, for example 0 meters or any other negative or positive value. Advantageously the first point is chosen according to the normal map used, for example by a user. By representing the memory card by a two-dimensional matrix comprising m lines and n columns, a point of the normal map corresponding to the intersection of a line and a column and having as indexes i and j of respectively the column and the line that cross over, the first point is characterized by these indexes i and j. The first point varies advantageously from one normal map to another, that is to say that these indexes i and j go on the principle that all normal maps have the same number of columns and lines, namely m lines and n columns. According to a variant, the first point is the same from one normal map to another, that is to say it indexes i and j remain the same. The reference height associated with the first point is identical from one normal map to another or varies from one normal map to another.

Then during a step 62, the height difference between the first point selected in step 61 and a second point is determined. The second point is chosen according to any known method for example according to the seed fill or flood fill methods. The second point is for example a neighbouring point of the first point in the normal map, that is to say a point touching the first point, that is to say a point chosen among the points having as indexes [i+1,j], [i+1,j+1], [i+1,j−1], [i,j+1], [i,j−1], [i−1,j], [i−1,j+1], [i−1,j−1] considering that the indexes of the first point are [i,j]. The second point is also a point for which the height difference with the first point was not determined. The determination of the height difference between the first point and the second point depends on the distance separating the first point from the second point in the plane of the normal map and the normal associated with the second point in the normal map, for example using the equation 1 described previously. The normal associated with a point of the normal map corresponds to the normal to the tangent plane at the surface in a point of a surface of a virtual object to which will be associated the point considered of the normal map if the normal map was applied to the surface of a virtual object. The normal information stored in the normal map enables the slope of a surface at the point considered to be deduced if the normal map was applied to the surface of a virtual object for example.

According to a variant, the absolute height at the second point is determined by totaling the reference height associated with the first point and the height difference. The information representative of height corresponds to the height difference or to the absolute height.

The absolute height determined is advantageously stored in a heightmap (also called a height field) comprising as many points and the normal map. The absolute height is advantageously associated with a point of the heightmap having the same indexes as the second point in the normal map. According to a variant, it is the height difference that is stored in the memory card, the height difference determined for the second point of the normal map being associated with a point of the heightmap having the same indexes as the second point in the normal map.

According to another variant, the estimation of the height difference between the first point and the second point is weighted by a coefficient $\alpha$. The weighting of the height difference enables the height variations to be amplified from one point to another when the absolute value of the coefficient $\alpha$ is strictly greater than 1 (that is to say $|\alpha|>1$) ($\alpha$ being a real number) and to reduce the height variations from one point to another when the value of a is comprised between 0 and 1, 0 and 1 being excluded (that is to say $0<|\alpha|<1$).

In order to determine the set of heights associated with the totality of points of the heightmap (which is the same as determining the height differences associated with points of the normal map) and according to a non-restrictive variant of the invention, the second point for which the height difference with the first point has been determined becomes the reference point, the reference height then becoming the height associated with the second point (or the height difference associated with the second point). A third point is then chosen according to the same method as that used to choose the second point, the third point neighbouring the second point and different from the first point and second point. The height difference between the third point and the second point is determined according to the distance separating the third point from the second point in the plane of the normal map and according to the normal associated with the third point in the normal map. Taking the second point as reference point with as reference height (or height difference) the height (respectively the height difference) determined previously enables the first point to be conserved as unique reference (for the second point and the third point). By advancing one by one in the normal map, it is thus possible to determine all the heights (respectively the height differences) of the heightmap, the heights (respectively the height differences) determined being stored in the heightmap.

FIG. 7 shows a method for estimation of an item of information representative of a height implemented in a device 5, according to a second non-restrictive particularly advantageous embodiment of the invention.

During an initialisation step 70, the different parameters of the device 5 are updated. In particular, the parameters representative of the virtual environment 1 and/or the information contained in the different maps (for example the normal map) are initialised in any way.

Then during a step 71, a first point is selected from among the set of points of a normal map. Step 71 being identical to step 61 previously described, it will not be described again in this paragraph.

Then during a step 72, a vector located between the first point and the second point is determined. The ends of the vector correspond to respectively the first point (origin of the vector) and the second point (second end of the vector). The distance separating the first point from the second point in the plane of the normal map is determined from the vector and corresponds to the normal of the vector.

Then during a step 73, a height difference between the first point and the second point is estimated. Step 73 being identical to step 62 previously described, it will not be described again in this paragraph.

Finally, during a step 74, an occlusion factor $\beta$ associated with the second point is estimated from heights associated with points surrounding the second point. The occlusion factor is for example determined using equation 7 previously described. According to another example, a plurality of rays having as origin the second point are launched across a halfsphere having as a base a disk (having as centre the second point and a radius determined by a user or fixed, the radius being for example chosen so that the disk encompasses a plurality of points of the normal map around the second point, for example 10, 20, 50 or 100 points) and as centre the second point and rising above the disk. The intersections between each of these rays and a surface 3 representative of variations of heights associated with points comprised in the disk (these heights being for example stored in the heightmap and determined according to the method described in steps 61 and 62 or in steps 71 to 73) are determined by discretizing each of the launched rays. The surface 3 corresponds to the raised surface connecting the points rising from the height H that associates them above the heightmap or the normal map. The occlusion factor associated with the second point corresponds to the ratio between the number of rays having an intersection with the surface 3 over the total number of rays. The discretization of each of the rays launched enables the intersection point with the surface 3 to be determined with precision when it exists.

According to a variant, the occlusion factor $\beta$ is stored in an occlusion map and is associated with a point of the occlusion map for which the indexes [i, j] are identical to those of the second point in the normal map. Advantageously the occlusion map comprises as many points as the normal map or the heightmap, a point of the occlusion map being associated with a point of the normal map, an occlusion factor being associated with each of the points of the occlusion map.

Naturally, the invention is not limited to the embodiments previously described.

In particular, the invention is not limited to a method for estimation of an item of information representative of a height but also extends to any device implementing this method and notably any devices comprising at least one GPU. The implementation of calculations necessary to the estimation of information representative of height is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the display of synthesis images for example. The implementation of the invention in postproduction offers the advantage of providing an excellent visual display in terms of realism notably while reducing the required calculation time.

The invention also relates to a method for estimation of ambient occlusion in a virtual environment 1 for the display or composition of a video image, in two dimensions or in three dimensions, for which the quantity of light received by any point visible from a viewpoint according to one or several observation directions is calculated and the information representative of the light that results is used for the displaying of pixels of the image, each pixel corresponding to an observation direction. The calculated light value for displaying by each of the pixels of the image is re-calculated to adapt to the different viewpoints of the spectator.

The present invention can be used in video game applications for example, whether via programs that can be executed in a PC or portable type computer or in specialised game consoles producing and displaying images live. The device 5 described with respect to FIG. 5 is advantageously equipped with interaction means such as a keyboard and/or joystick, other modes for introduction of commands such as for example vocal recognition being also possible.

We claim:

1. A method for estimation of an item of information representative of a height, wherein the method comprises the following steps:
    selecting a first point from among a plurality of points of a normal map, a normal being associated with each of the points of said plurality, a reference height being associated with said first point,
    estimating a first height difference between the first point and a second point of the normal map different from the first point according to the normal associated with the second point and the distance separating the first point from the second point in the normal map,
    computing a second height difference between the second point and a third point of the normal map different from first and second points according to the normal associated with the third point and the distance separating the second point from the third point in the normal map; and
    computing a first occlusion factor associated with the second point and a second occlusion factor associated with the third point, said first and second occlusion factors being computed from heights associated with a plurality of points surrounding respectively said second point and said third point, and a plurality of points surrounding respectively said second point and said third point which are defined by a disk having a predetermined radius and centered about the second point and the third point, respectively.

2. The method according to claim 1, wherein the computing of the first height difference comprises a computing a vector between the first point and the second point and the computing of the second height difference comprises computing a vector between the second point and the third point.

3. The method according to claim 1, wherein a height associated with the second point is equal to the reference height to which is added the computed first height difference and in that a height associated with the third point is equal to the height associated with the second point to which is added the computed second height difference.

4. The method according to claim 1, wherein the computing of the first and/or second height difference is weighted by a weighting factor.

5. The method according to claim 1, wherein said first height difference is associated with the second point and stored in a heightmap and said second height difference is associated with the third point and stored in the heightmap.

6. The method according to claim 5, wherein said heightmap is applied to an object surface of a virtual environment.

7. The method according to claim 1, wherein said first and second occlusion factors are stored in an occlusion map.

8. A non-transitory computer readable medium comprising instructions of program code for executing steps of the method according to claim 1, when said program is executed on a computer.

9. A device configured for the estimation of an item of information representative of a height, wherein the device comprises a memory and at least a processor configured for:
    selecting a first point from among a plurality of points of a normal map, a normal being associated with each of the points of said plurality, a reference height being associated with said first point,
    computing a first height difference between the first point and a second point of the normal map different from the first point according to the normal associated with the second point and the distance separating the first point from the second point in the normal map and computing a second height difference between the second point and a third point of the normal map different from the first and second points according to the normal associated with the third point and the distance separating the second point from the third point in the normal map; and
    computing a first occlusion factor associated with the second point and a second occlusion factor associated with the third point, said first and second occlusion factors being computed from heights associated with a plurality of points surrounding respectively said second point and said third point, and from a plurality of points surrounding said second point and said third point, respectively and which are defined by a disk having a predetermined radius and centered about the second point and the third point, respectively.

* * * * *